(No Model.)
R. L. KING.
PACKING RING FOR PISTON RODS.
No. 285,139. Patented Sept. 18, 1883.
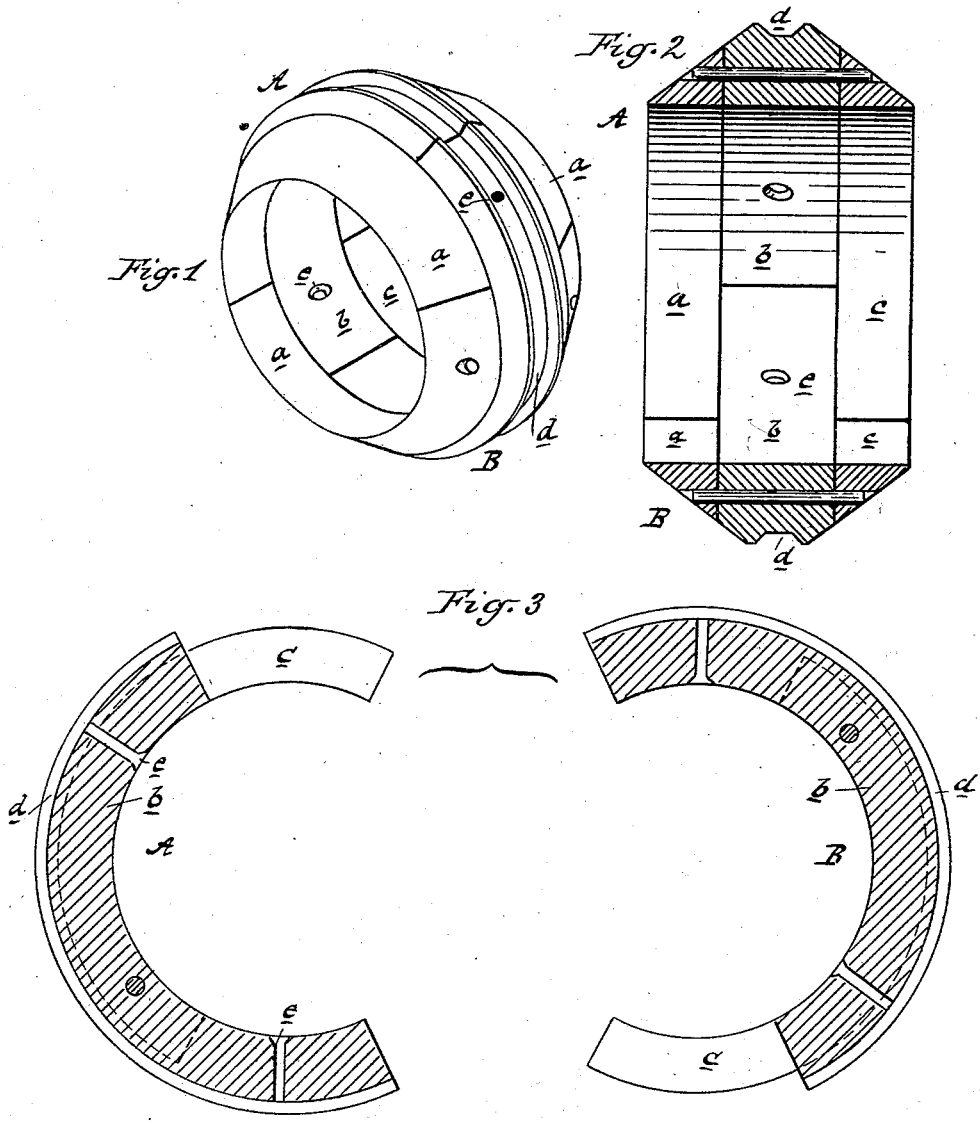
Attest:
A. Barthel
Inventor:
Robert L. King
by his Atty

UNITED STATES PATENT OFFICE.

ROBERT L. KING, OF FLINT, MICHIGAN.

PACKING-RING FOR PISTON-RODS.

SPECIFICATION forming part of Letters Patent No. 285,139, dated September 18, 1883.

Application filed June 27, 1883. (No model.)

*To all whom it may concern:*

Be it known that I, ROBERT L. KING, of Flint, in the county of Genesee and State of Michigan, have invented new and useful Improvements in Packing-Rings; and I do hereby declare that the following is a full, clear, and exact description thereof, reference being had to the accompanying drawings, which form a part of this specification.

This invention relates to certain new and useful improvements in the construction of packing-rings for piston-rods or other places where a like packing is available.

The invention consists in the peculiar construction and combination of the parts, as more fully hereinafter described.

Figure 1 is a perspective view of my improved packing complete. Fig. 2 is a vertical central cross-section. Fig. 3 is a vertical central section with the two sections of the packing drawn apart.

In the accompanying drawings, which form a part of this specification, there is shown my packing-ring, composed of two like sections, A and B, each section being composed of three parts, $a$, $b$, and $c$, the interior faces of which are coincident, while upon their exterior faces the parts $a$ and $c$ are beveled from their broadest part, where they are coincident with the two sides of the center part, $b$, to their outer edges. The central part, $b$, is beveled in both directions from the center toward the edge, so that when the parts are together these bevels are upon the same angle as those of the parts $a$ $c$. The center of the part $b$ has an annular recess, $d$, turned in its periphery, and two or more holes, $e$, are drilled from this recess through the interior face of this part.

It will be seen that each of the sections A and B is composed of three parts, $a$ $b$ $c$, as described, each one of these parts being the half of a ring, and these three parts are pivotally secured together, as shown in Fig. 2, so that the parts $a$ $c$ project beyond the end of the part $b$ upon one end, so that when both sections are put together they form a perfect interlocking ring, as shown in Fig. 1, with broken joints, for the purpose of making them steam-tight, and the piston reciprocating within such ring is lubricated through a hole in the side wall of the stuffing-box coincident with the annular recess in the center ring, such oil finding its way through the holes $e$ to the piston-rod. This packing may be secured in its place in any convenient way, although I deem that a preferable way of securing it is to use wooden glands in the form of rings, with beveled inside faces to fit the beveled outside faces of the ring.

There are many advantages to be derived from the use of this packing which are too numerous to mention, and which will readily suggest themselves to the mind of every practical mechanic upon examination.

This packing has been thoroughly tested on railway-locomotives and found to be perfect in its operation, requiring less lubricant, and is more easily arranged in place than the packing usually employed.

What I claim as my invention is—

A packing-ring of two sections, A B, each of said sections being composed of the half-rings $a$ $b$ $c$, pivotally secured together, and provided with means for lubrication, substantially as and for the purposes described.

ROBERT L. KING.

Witnesses:
 H. S. SPRAGUE,
 E. SCULLY.